United States Patent [19]

Thomson

[11] Patent Number: 5,682,487
[45] Date of Patent: Oct. 28, 1997

[54] METHOD AND APPARATUS PROVIDING RESIZABLE VIEWS

[75] Inventor: Allan Thomson, Cupertino, Calif.

[73] Assignee: Bay Networks, Inc., Santa Clara, Calif.

[21] Appl. No.: 257,561

[22] Filed: Jun. 10, 1994

[51] Int. Cl.⁶ .................................................. G06F 3/14
[52] U.S. Cl. ..................... 395/342; 395/340; 395/969
[58] Field of Search ........................... 395/155, 156, 395/157, 160, 161, 139, 324, 331, 339, 340, 342, 375

[56] References Cited

U.S. PATENT DOCUMENTS

| | | | |
|---|---|---|---|
| 5,289,574 | 2/1994 | Sawyer | 395/157 |
| 5,325,481 | 6/1994 | Hunt | 395/159 |
| 5,345,550 | 9/1994 | Bloomfield | 395/156 |
| 5,367,624 | 11/1994 | Cooper | 395/161 |
| 5,371,847 | 12/1994 | Hargrove | 395/157 |
| 5,377,318 | 12/1994 | Wolber | 395/159 |
| 5,430,838 | 7/1995 | Kuno et al. | 395/133 |
| 5,459,825 | 10/1995 | Anderson et al. | 395/139 |

*Primary Examiner*—Raymond J. Bayerl
*Assistant Examiner*—Steven P. Sax
*Attorney, Agent, or Firm*—Blakely, Sokoloff, Taylor & Zafman LLP

[57] ABSTRACT

A method and apparatus for aiding in providing views of multiple network devices in a network management application. The method can include the resizing of an view to allow for presentation of multiple views. The method includes the steps of displaying a first image of a network device in a first size; selecting a second size, the second size being different than the first size; and displaying a second image of said network device in a second size.

12 Claims, 7 Drawing Sheets

METHOD AND APPARATUS PROVIDING RESIZABLE VIEWS

BACKGROUND OF THE INVENTION

1. Field of Invention

The present invention relates to the field of image display. In particular, the present invention describes a method and apparatus for resizing a view of a network device in a network management application.

2. Description of Related Art

In recent years, the remote monitoring and controlling of network devices in network management applications has become commercially important. Typically, in remote monitoring and control systems, a view of a physical appearance of a network device is displayed on a network administrator's computer. The physical appearance is typically based upon a photo-realistic image of the particular network device, for example, the front of a network hub. The network administrator can then, for example, monitor information about the status of the particular hub. Generally, a view of most any device on the network can be generated.

An example of a network management application having remote monitoring and control features can be found in U.S. Pat. No. 5,226,120. The network management application presents a view of a stored image of a hub and the status of a portion of the network can be determined.

One difficulty with these systems is that a network administrator may need to display information from a number of the network's hubs or other devices. For example, the network administrator may want to obtain information on the status of all the hubs on the network at the same time. In prior art systems, the network management systems could open windows on a number of devices, however, the network administrator often could not see all the views of the devices at the same time because the windows overlapped.

A method and apparatus for aiding in increasing the number of views that can be displayed simultaneously.

SUMMARY OF THE INVENTION

A method and apparatus for aiding in increasing the number of views that can be displayed simultaneously is described. To aid a network administrator in the analysis of a number of devices on a network, network management applications should display views of a number of network devices. In one embodiment, multiple views of network devices can be displayed by resizing the views. This method includes the steps of displaying a first image of a network device in a first size; selecting a second size, the second size being different than the first size; and displaying a second image of the network device in said second size. In another embodiment of the present invention, important visual information is retained while multiple network device views are displayed.

Although a great deal of detail has been included in the description and figures, the invention is defined by the scope of the claims. Only limitations found in those claims apply to the invention.

BRIEF DESCRIPTION OF THE DRAWINGS

The present invention is illustrated by way of example, and not limitation, in the figures. Like references indicate similar elements.

DESCRIPTION OF THE PREFERRED EMBODIMENT

OVERVIEW

A method and apparatus for increasing the number of views that can be displayed simultaneously is described. In the following description, numerous specific details are set forth such as X Window System structures, data structure information, etc., in order to provide a thorough understanding of the present invention. It will be obvious, however, to one skilled in the art that the present invention may be practiced without these specific details. In other instances, well-known circuits, structures and techniques have not been shown in detail in order not to unnecessarily obscure the present invention.

To aid a network administrator in the analysis of a number of devices on a network, network management applications should display views of a number of network devices. These views should not overlap so as to obscure important visual information in one view by another view. However, typically, only a single screen is used to show information from the network management system. This puts an upper limit on the maximum screen real estate available for displaying the information. By scaling the views, views of multiple devices can be more easily seen by the network administrator.

Although in one embodiment, a straight scaling of a photo-realistic image of a network device is performed, it has been discovered, that more desirable results can be achieved using an alternate embodiment. Rather than scale one image, a second image, corresponding to the new size, is substituted and displayed. By substituting a second image for the first image, enhancements can be made to the second image. This allows important visual information to be more easily viewable at smaller sized views.

COMPUTER SYSTEM

Figure 1:
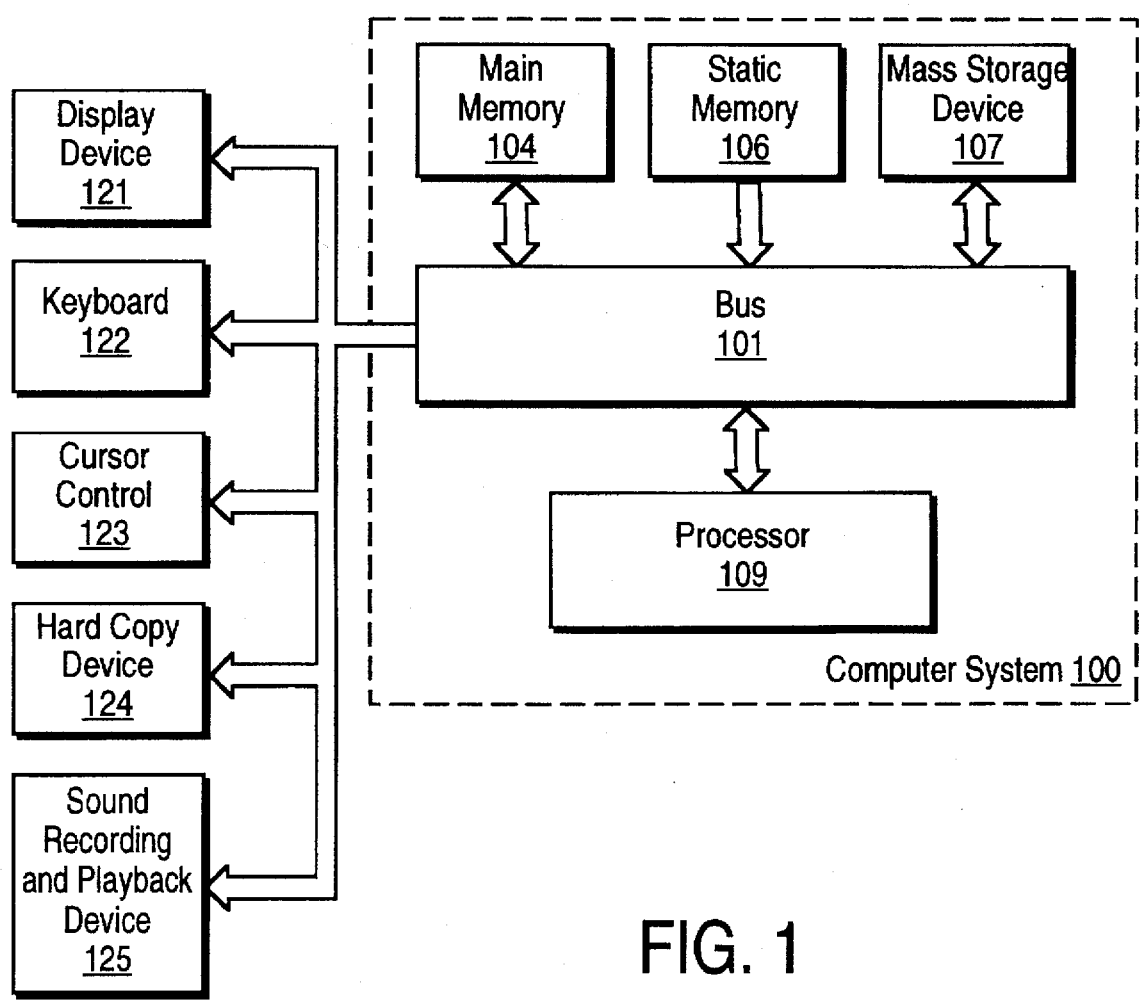
FIG. 1 illustrates a computer system upon which one embodiment of the present invention can be implemented.

Referring to FIG. 1, a computer system upon which an embodiment of the present invention can be implemented is shown as 100. Computer system 100 comprises a bus 101, or other communications hardware and software, for communicating information, and a processor 109 coupled with bus 101 for processing information. System 100 further comprises a random access memory (RAM) or other dynamic storage device 104 (referred to as main memory), coupled to bus 101 for storing information and instructions to be executed by processor 109. Main memory 104 also may be used for storing temporary variables or other intermediate information during execution of instructions by processor 109. Computer system 100 also comprises a read only memory (ROM) 106, and/or other static storage device, coupled to bus 101 for storing static information and instructions for processor 109. Data storage device 107 is coupled to bus 101 for storing information and instructions. In one embodiment, data storage device 107 includes a library of graphical images used to generate views of various network devices.

Furthermore, a data storage device 107, such as a magnetic disk or optical disk, and its corresponding disk drive, can be coupled to computer system 100. Computer system 100 can also be coupled via bus 101 to a display device 121 for displaying information to a computer user. Display device 121 is used to display views of network devices. Display device 121 can include a frame buffer, specialized graphics rendering devices, a cathode ray tube (CRT), and/or a flat panel display. An alphanumeric input device 122, including alphanumeric and other keys, is typically coupled to bus 101 for communicating information and command selections to processor 109. Another type of user input device is cursor control 123, such as a mouse, a trackball, a pen, a touch screen, or cursor direction keys for communicating direction information and command selections to processor 109, and for controlling cursor movement on display device 121. This input device typically has two degrees of freedom in two axes, a first axis (e.g., x) and a second axis (e.g., y), which allows the device to specify positions in a plane. However, this invention should not be limited to input devices with only two degrees of freedom.

Another device which may be coupled to bus 101 is a hard copy device 124 which may be used for printing instructions, data, or other information on a medium such as paper, film, or similar types of media. Additionally, computer system 100 can be coupled to a device for sound recording, and/or playback 125, such as an audio digitizer coupled to a microphone for recording information. Further, the device may include a speaker which is coupled to a digital to analog (D/A) converter for playing back the digitized sounds.

Also, computer system 100 can be a terminal in a computer network (e.g., a LAN). Computer system 100 would then be a computer subsystem of a computer system including a number of networked devices.

DISPLAYING A VIEW OF A NETWORK DEVICE

One embodiment uses the X Window System™, with the OSF/Motif™ widget library, to generate a view of a photo-realistic image of a network device (X Window System™ is a trademark of The Massachusetts Institute of Technology. Motif is a trademark of the Open Software Foundation). Numerous references exist for the X Window System, however, a general review of some concepts is presented herein. Other embodiments use other windowing systems for displaying views of images of network devices (e.g. Open Look from Sun Microsystems, or Microsoft Windows).

The X Window System is a graphical windowing interface for computers. The X Window System is based on a client server model. A single process, known as a server, is responsible for all input and output devices. The server creates and manipulates windows on the screen, produces text and graphics, and handles input devices such as a keyboard and mouse. A client is an application that uses the server's facilities. In the context of the present embodiment, the client is the network management application.

The following definitions will help in the understanding of the following disclosure:

Display: a single server process. Display can be used interchangeably with "server." This definition differs from the computer monitor "display".

Screen: a single hardware output device such as display device 121. A single display can support many screens.

Widget: a user interface component used by programmers to create a user interface. Examples of widgets are buttons, scroll bars, title bars, menus, and dialog boxes. A widget includes a user interface window and some procedures that operate with the window. The window includes the information that the computer user will see.

For further background on the X Window System, see Scheifler, R. W. *X Window System*. USA, Digital Press, 1988; Young, D. A. *The X Window System: Programming and Applications with Xt*. Englewood, N.J., Prentice-Hall, 1990.; and, Asente, P. J. *X Window System Toolkit: The Complete Programmer's Guide and Specification*, Digital Press, 1990.

Figure 2:
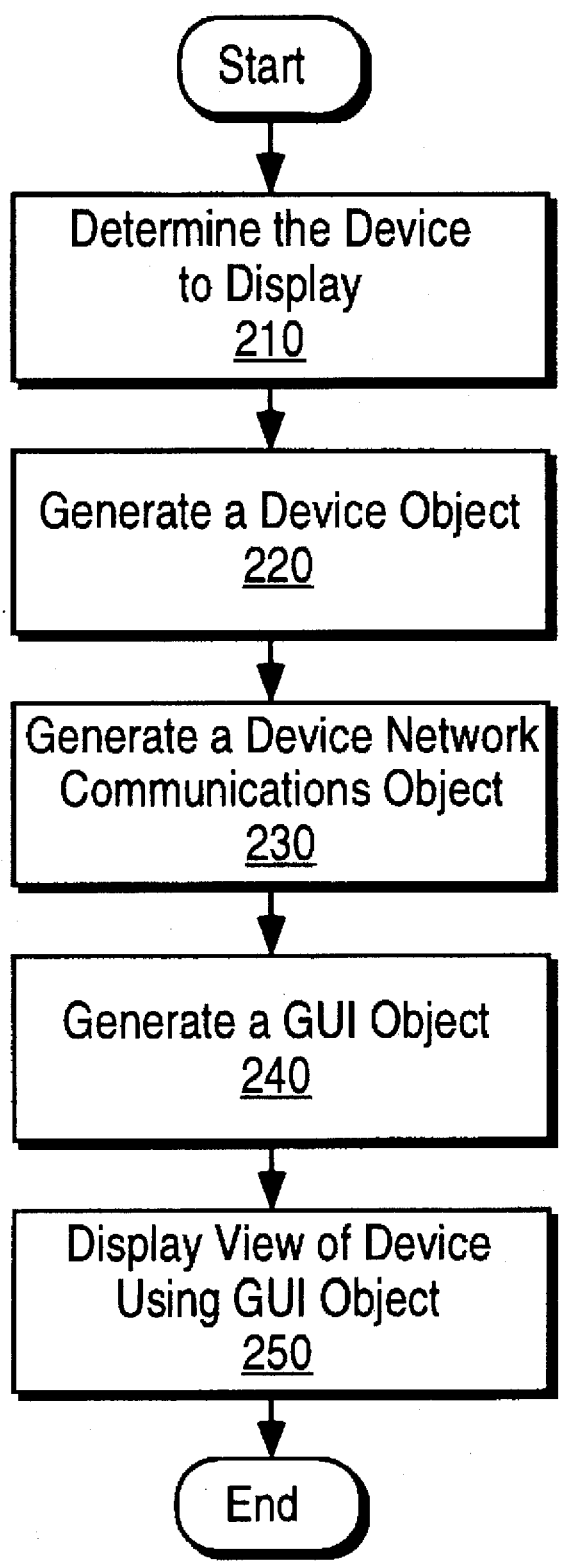
FIG. 2 is a flowchart of a method for displaying a view of a network device.

The network management application (an X client) accesses one, or more, photo-realistic images to cause the generation of the view on the display. The view is distinct from the image. The view is what can been seen on the display by the network administrator. The images are typically hand drawn photo-realistic images of portions of network devices. Photo-realistic means that the images substantially appear to be a photograph of an object. Typically, multiple images are used to generate a view of a network device. FIG. 2 is a flowchart of a method for displaying a view of a network device.

At 210, the network administrator selects the particular network device to be displayed by the network management application. For example, a network administrator may select a particular hub that is located on the network. The particular type of network device has a certain set of images associated with that type of network device. For example, for a particular hub, the type of hub is determined, and the one or more images of that type of hub can be accessed.

At 220, a device object, having the functions and data for representing the particular selected network device, is created. The device object has definitions of how the network device operates and how the network management application can obtain information from that network device. In one embodiment, the device object is implemented in C++. In general, the device object is the structure that interfaces with the network management application, controls the communications with the network device over the network, and controls the view of the network device.

To communicate over the network with the network device, the device object includes a device network communications object. The generation of the device network communications is shown at 230. For example, the device network communications object may include SNMP (Simple Network Management Protocol), IETF Request For Comments 1067, routines for communicating with a selected network device such as a hub.

To control the view of the network device, the device object includes a graphical user interface object (GUI object). The generation of the GUI object is shown at step 240. In one embodiment of the present invention the GUI object is created from a number of widgets. The widgets form a widget tree. The top most widget, of the widget tree, is a child of a widget used for the network management application. The top most widget has an image representing the background of the network device. In the example above, the background would be the face plate of a hub. The remaining widgets in the widget tree represent other portions of the network device. For example, a widget may represent a port and that widget would include an image of the port. Other widgets may be used to represent LEDs, buttons, text, port connectors. The present invention is not restricted to the above specific structure of the widget tree, or even to the use of widgets.

In one embodiment of the present invention each image associated with each widget is a photo-realistic image of a portion of the network device. For example, a port widget may represent a 10-BaseT port image. (10-BaseT is a communications protocol specification, IEEE 802.3, using unshielded twisted pair wiring and runs at 10,000,000 bits per second). The port widget would include a photo-realistic image of the from of a 10-BaseT port. When the hub containing the port widget is displayed, the image of the 10-BaseT port is also displayed on the front of the hub.

At 250, the network management application causes the GUI object to be displayed. In one embodiment of the present invention, this is accomplished by sending to the X display, the X manage command, with a pointer to the top most widget in the widget tree. This will cause each of the child widgets, in the widget tree, to provide the display with their corresponding images. The images are then displayed as a view of the network device.

Other embodiments in the present invention can be used to provide a view of an image of a network device. What is important is that a photo-realistic view of an image of a network device can be provided.

RESIZING A VIEW OF A NETWORK DEVICE

Once a view of a network device has been displayed, the network administrator may want to display a view of another network device. Because full size views require a great deal of information, it is convenient to resize the view of the first network device.

Resizing the view can be accomplished in a number of ways. In a first embodiment of the present invention, the view is resized by shrinking the full size image to create the smaller view. For example, to shrink an view down to 25% of it's full size, the network device image is shrunk down to 25% of its normal size. This type of resizing can be accomplished by interpolating a number of pixels from the full size image to generate the smaller sized view. Another implementation, selects one pixel out of every N pixels from the full size image, where N is determined by the amount of shrinking to be done.

One problem with resizing a view to a smaller size is that visual information is lost. Using the shrinking techniques of above, all the information contained in the image is degraded equally. However, this does not recognize that some information is more important to the network administrator than other information. Therefore, an alternate embodiment of the present invention enhances some information as the view is being reduced. In this embodiment, as the view becomes smaller, important information is enhanced relative to the remainder of the view. This enables the network management application to retain important visual information for the network administrator.

Figure 3:
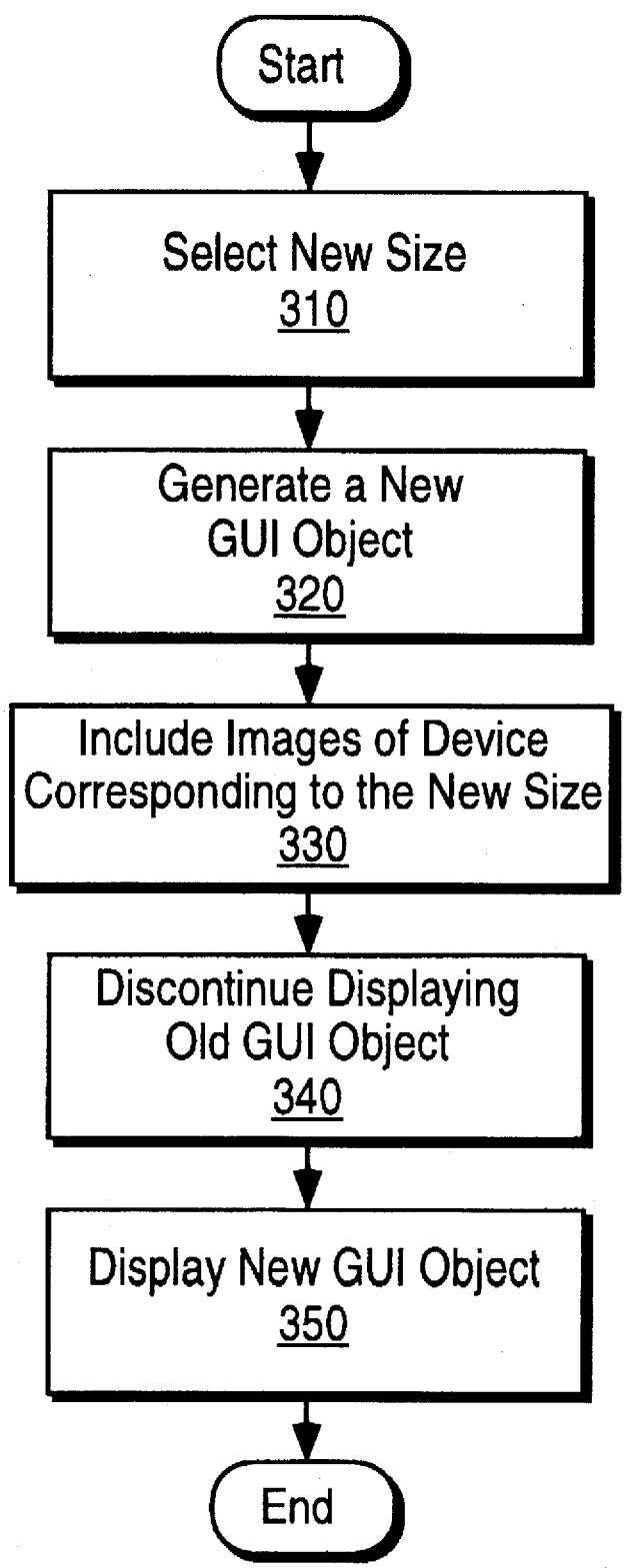
FIG. 3 is a flowchart of a method for resizing a view of a network device.

FIG. 3 is a flowchart of a method for resizing a view of a network device wherein the enhanced information is provided at smaller than full size views.

At 310, the network administrator selects a new size of the view of the network device. In one embodiment this is accomplished by selecting one of a number of predetermined sizes. For example, the network administrator would select one of 100%, 66% or 33%. The 100% view is used when all the graphical information relating to the network device is important. At 66%, some graphical information has been lost to provide more screen real-estate for other views or applications. At 33%, more information has been lost to provide more screen real-estate for other views or applications. Typically, the 33% view is used when LED colors are to be viewed, but the text identifying each LED is not needed.

At 320, the network management application generates a new GUI object. This object includes the new widget tree corresponding to the new size.

At 330, the network management application accesses a library of network device portion images. A set of images associated with a particular size is selected. In one embodiment, images for three different sizes are included in the library. One set represents a 100% size. The other two sets represent 66% and 33% sizes respectively. For example, if a 33% view of a hub were to be displayed, then a set of images representing a 33% view of a hub would be selected. Also, in step 330, each widget is assigned an image from the set of images for the selected size. For example, at 33%, a widget representing a network port, would include an image of a network port at 33% of the full images' size.

At 340, the network management application discontinues displaying the old GUI object. At 350, the new GUI object is displayed. In one embodiment of the present invention, this is accomplished by transmitting an X Window System manage call to the X display. The call contains a pointer to the new widget tree. Assuming computer system 100 is used, the X display then outputs all the images in the new widgets onto the display device 121.

In another embodiment, all the widget trees for all the sizes are created at initialization. For example, widget trees for 100%, 66%, and 33% views are created. Then, when a resize operation is made, the network management application transmits the manage call with a pointer to the corresponding widget tree.

In an alternate embodiment, the network administrator configures the network application for sizes to be viewed. For example, the network administrator may require 100%, 75% and 50%. In one embodiment, the network management application then creates the new views by shrinking the views as described above. In another embodiment, the network management application interpolates between two images from two sizes. For example, if the network administrator chooses 75%, the network management application would interpolate between the 100% images and the 66% images to create a 75% view.

In another embodiment, the network administrator can select information that is visually important, and should therefore be enhanced when resizing occurs. This can be done, for example, by selecting areas of an view that are to be resized to a lesser degree than the surrounding view.

DISMAY STRUCTURE

Figure 4:
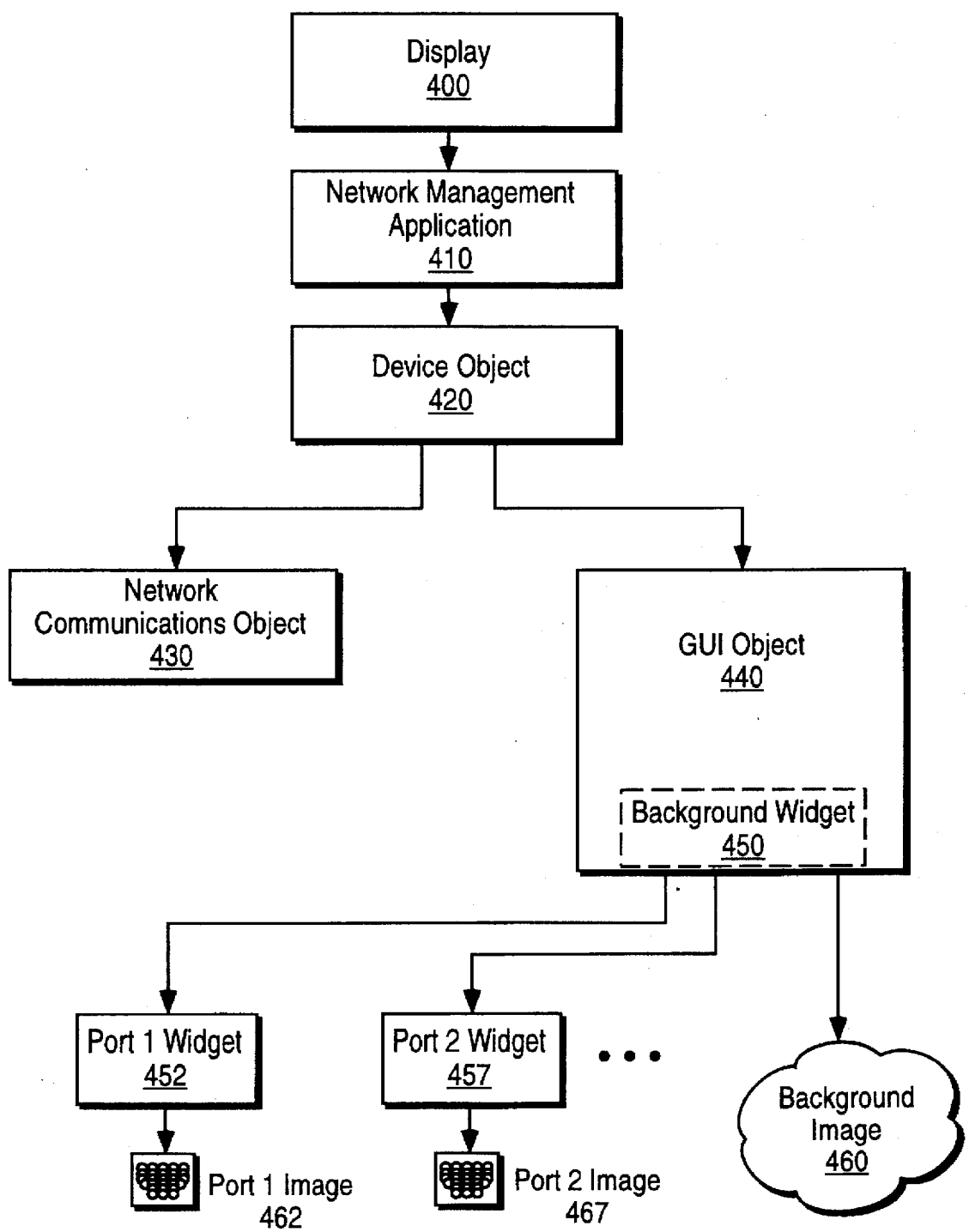
FIG. 4 is a block diagram illustrating the structure of the data and functions used to display a resized view of a network device.

FIG. 4 is a block diagram illustrating the structure of the data and functions used to display a resized view of a network device.

Display 400 includes an X window display. This display controls the access to the screen by the network management application. Network management application 410 includes a program that is capable of communicating with devices on the network and displaying status information. The network management application 410 is also capable of controlling devices on the network.

Network management application 410 includes objects representing devices on the network. In the example of FIG. 4, network management application 410 includes one device object 420. As noted above, device objects include functional and data representations of particular devices on a network. That is, device object 420 includes network communications object 430 and GUI object 440. GUI object 440 includes a widget tree. In an alternate embodiment, device object 420 incorporates the data and functions of the network communications object 430 and the GUI object 440, and network communications object 430 and GUI object 440 are not needed.

In one embodiment, network management application 410, display 400, device object 420, network communications object 430, and GUI object 440 are implemented in C++. However, the present invention is not limited to an implementation in C++. One skilled in the art would understand that multiple embodiments exist that can be implemented in any of a number of object oriented and/or structured programming languages.

The widget tree typically includes one parent, or top most widget. In the example of FIG. 4 this top most widget is the background widget 450. The widget tree would also include other widgets for example, port 1 widget 452 and port 2 widget 457. Each of these widgets represent ports on, for example, a hub.

Each widget, representing a part of a network device, includes an associated X image. X images are created from the photo-realistic images of the network device. Typically, the X images are created using the XCreateImage(), an X Window System, call. Each X image is then assigned to a particular widget in the widget tree. However, to not overly obscure the description, X images and photo-realistic images will be referred to generally as images. One of ordinary skill in the art will understand when to draw the distinction.

In another embodiment, each widget can include a selected image and a de-selected image. For example, a port widget will include a selected port image and a de-selected port image. When the port is selected, the selected port image will be displayed. When the port is not selected, the de-selected port image will be displayed.

As mentioned previously, when a resize is performed, a new widget tree is created. The network management application creates each widget from the corresponding image. This simplifies the creation of different sized views because the images determine the display area used by the view. Each widget determines how large the widget must be from the widget's corresponding image. Therefore, a 100% size view is made from information stored in a number of widgets. Each of these widgets knows its display area dimensions because they are based upon the dimensions of its corresponding 100% size image. Therefore, the 100% view display area depends on the aggregate display area of all the widgets used to create the 100% view. Using this technique also simplifies using enhanced data. If a particular portion of the network device is to be emphasized, then its corresponding image, for that size, can be made as large as is needed. Note that by making the enhanced image larger, that resulting part of the network work device will appear not to scale. The widget for that portion of the device makes itself as large as the enhanced image. The resulting view is then made from all the widgets, including the enhanced widget.

Figure 5:
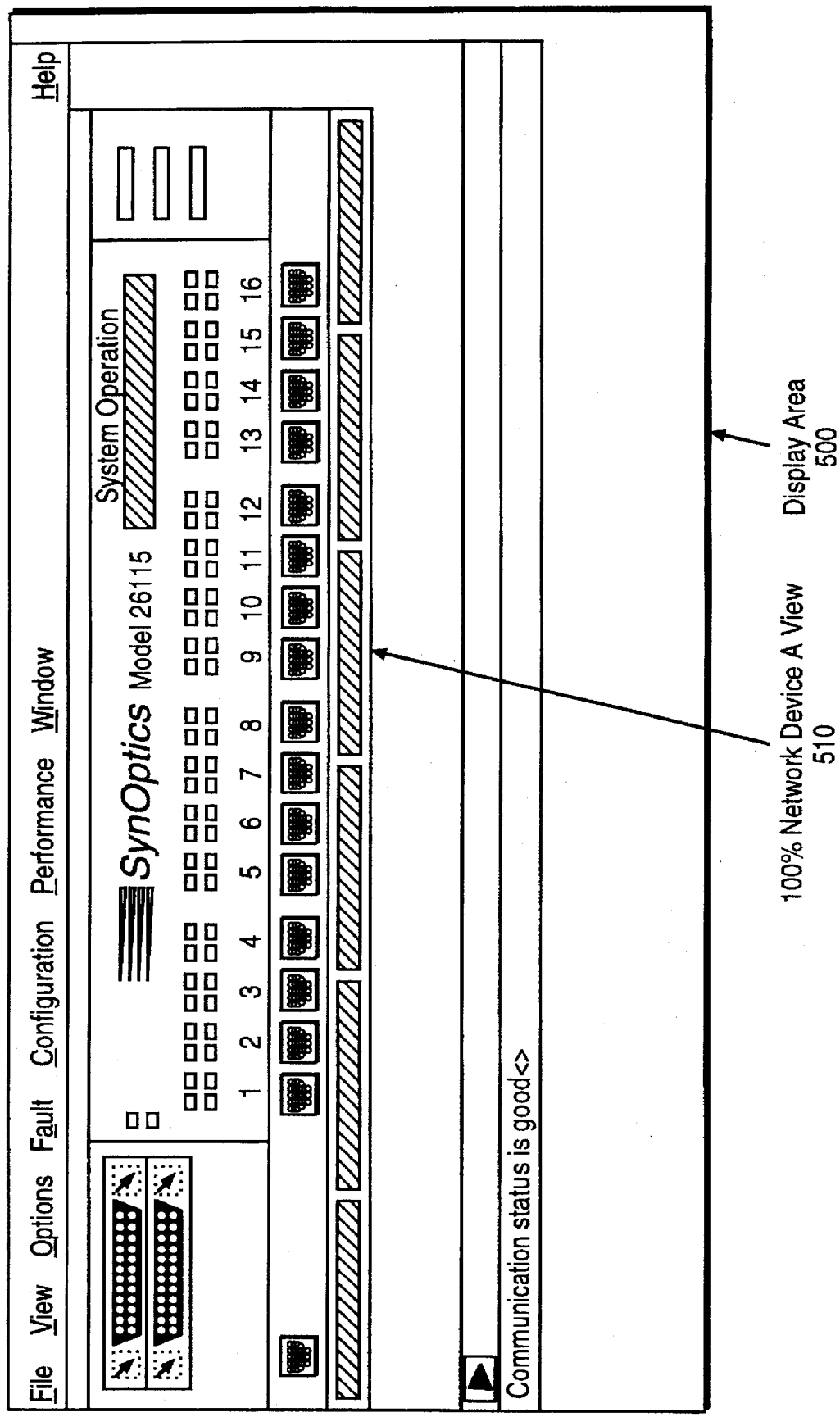
FIG. 5 is a 100% view of a network device.

In the example of FIG. 4, port 1 widget 452 includes port 1 image 462. Thus, when the information of port 1 widget 452 is displayed, port 1 image 462 will be displayed. Similarly, port 2 image 467 is included in port 2 widget 457. Background widget 450 also includes a background image 460. Port 1 image 462 corresponds to the part of the view of FIG. 5 shown as port 1 of the hub.

EXAMPLES OF RESIZED NETWORK DEVICE VIEWS

The following discussion helps illustrate some of the benefits of the above embodiments of the present invention. Each of FIGS. 5–7 includes a display area 500. Display area 500 represents the maximum display real estate available to the network management application.

100%

FIG. 5 is a 100% view of a network device. 100% network device A view 510 uses the vast majority of display area 500. It would be very difficult to open a view of a second hub and monitor both hubs simultaneously.

However, the 100% view does provide clear information regarding the various ports, connectors, LEDs, text and buttons, of the network device.

66%

Figure 6:
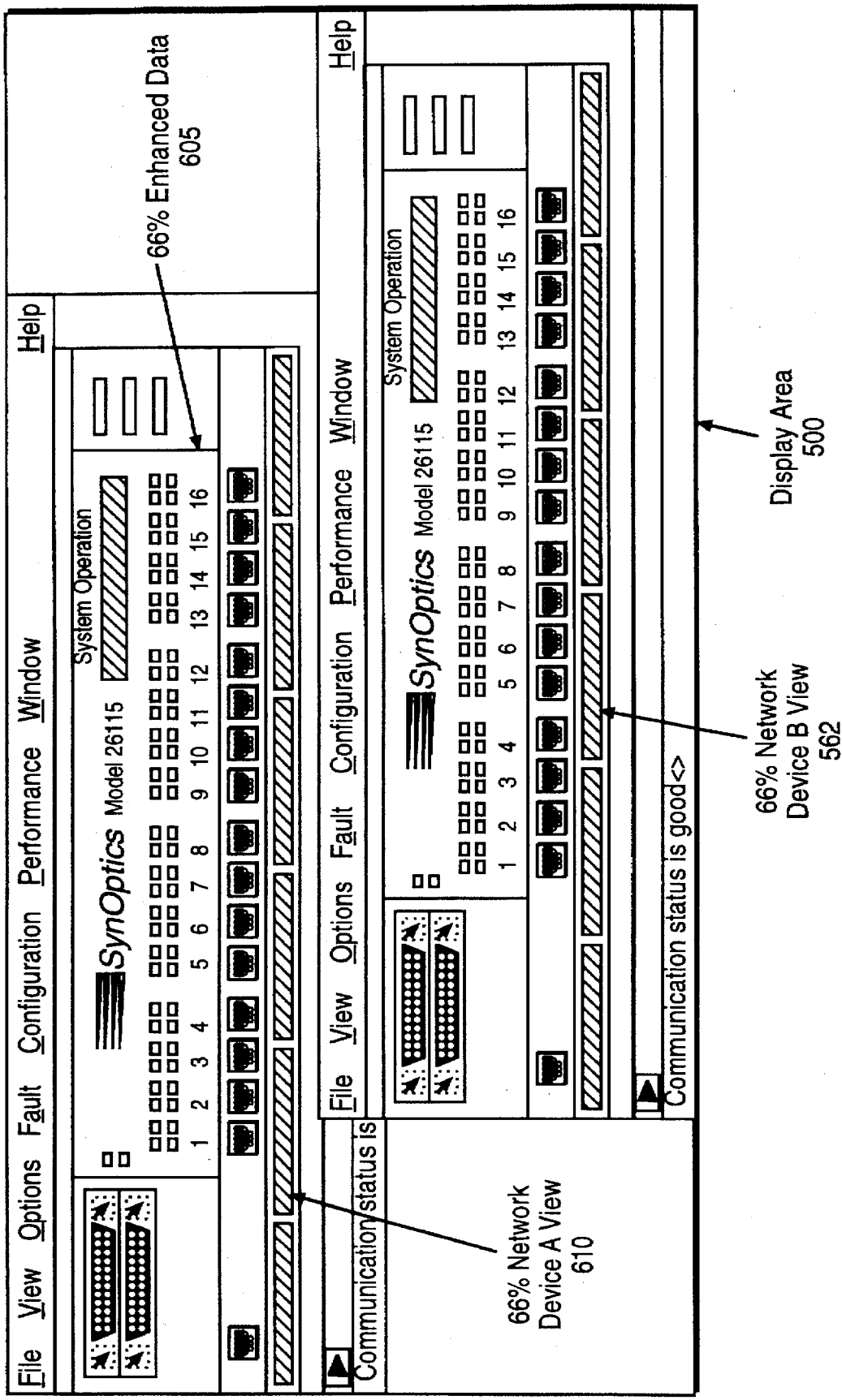
FIG. 6 is a 66% view of a network device.

FIG. 6 is a 66% view of a network device. 66% network device A view 610 (66% network device) represents a view of network device A reduced to 66% of the size of the original 100% network device A view 510. This size is particularly useful for displaying a few network devices on a display. In this example, a view of a second network device B is provided, see 66% network device B view 620.

A view 610 also includes enhanced data 605. The enhanced data has been included in the images included in the particular widget. In this example, the text indicating the port numbers and the LEDs for each port have been enhanced. The enhanced data has been included because, when shrinking from 100% to 66%, image information has been lost evenly across the image. However, it is has been determined that clear LED display and port numbers are particularly important. Therefore, in creating the images representing these portions of the network device, the image information in these images has been enhanced. Enhancing the image date may include darkening the outline of the image portion, making the image slightly larger, displaying the image in a slightly brighter or darker color, or any of a number of image enhancing techniques. What is important is that image information that is more important than other image information can be distinguished when shrinking the size of the entire image.

33%

Figure 7:
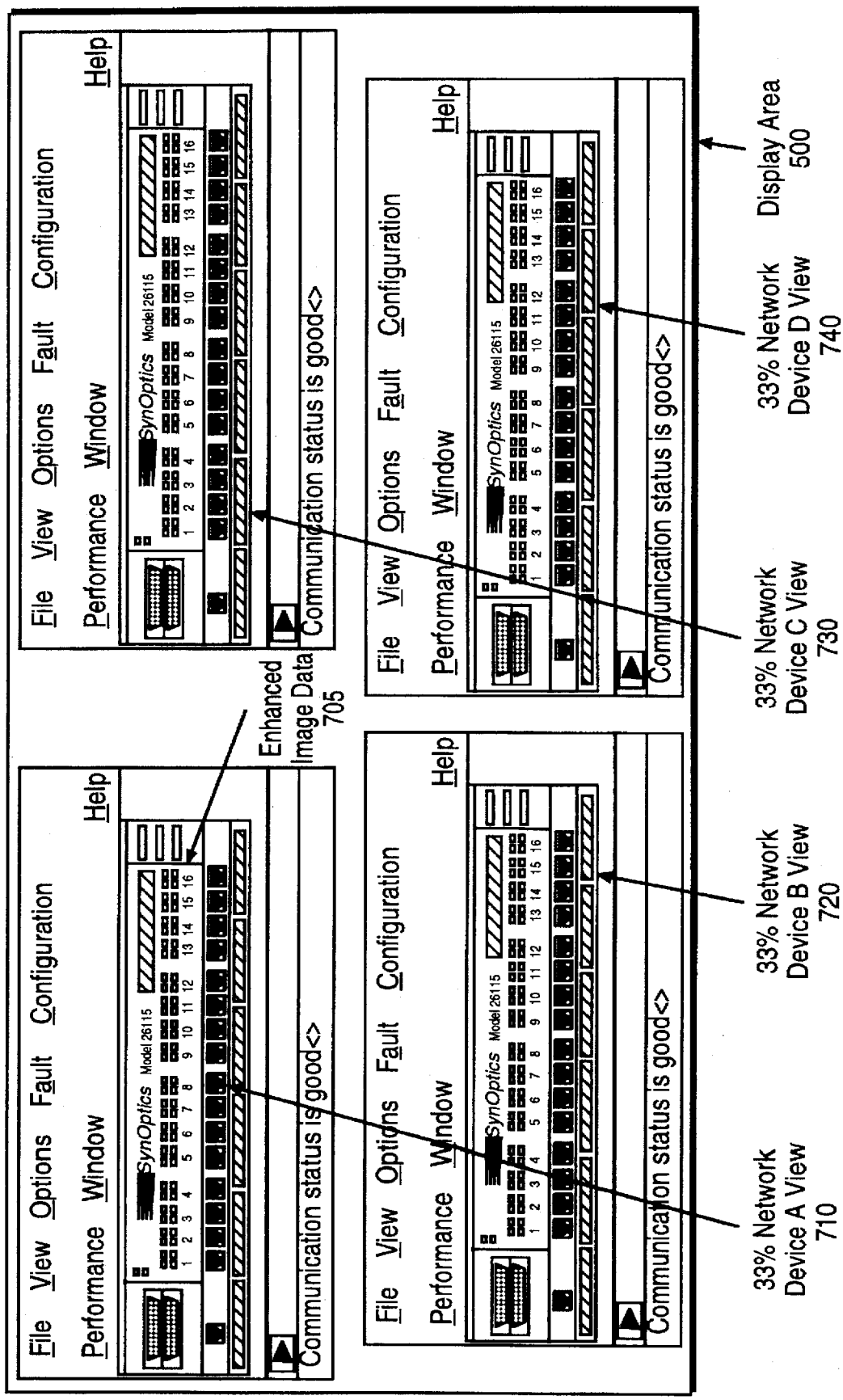
FIG. 7 is a 33% view of a network device.

FIG. 7 is a 33% view of a network device. This size is particularly useful when reviewing the status of a number of network devices from within the network management application. The network device A is still being displayed, only in a smaller view, 33% network device A view 710. Also displayed within display area 500 are: 33% network device B view 720, 33% network device C view 730, and 33% network device D view 740.

Again, enhanced data has been included in the images used to present views at this size. Enhanced image data 705 includes LEDs, ports, connectors, status displays and buttons. Note that the text indicating the port numbers have all but disappeared to make room for the LEDs.

Of course, the different sizes of various devices can be displayed simultaneously. For example, one view can be at 66% while another view can be at 100%. It is even possible to have two or more views of the same device being displayed at different sizes.

Although, the above description focuses on providing smaller views in a network management application, the above techniques could be used to provide larger size views as well. These types of views may be useful for demonstration purposes.

A method and apparatus for aiding in increasing the number of views that can be displayed simultaneously has been described.

What is claimed is:

1. A method of resizing a view in a network management application including the steps of:

displaying on a display a first image of a first network device, said first image displayed in a first size, said first image of said first network device configured to provide functional communication with said first network device;

increasing a number of images that are able to be simultaneously displayed on said display by selecting a second image of said network device, said second image being a smaller size than said first size, said second image configured to maintain functional communication with said network device;

displaying on said display a second image of said first network device in said second size; and displaying on said display a first image of a second network device, said first image of said second network device being displayed simultaneously with displaying said second image of said first network device, said first image of said second network device configured to provide functional communication with said second network device.

2. The method of claim 1 wherein said step of displaying said first image includes:

generating a device object corresponding to said first network device;

generating a first graphical user interface object including a first photorealistic image of said first network device corresponding to said first size;

generating a network communications object to provide said functional communication with said first network device, said first graphical user interface object and said network communications object being controlled by said device object; and displaying said first graphical user interface object.

3. The method of claim 2 wherein said step of displaying said second image includes:

generating a second graphical user interface object including a second photo-realistic image of said first network device corresponding to said second size;

selecting a portion of said second graphical user interface object and enhancing the portion;

ceasing display of said first graphical user interface object; and displaying said second graphical user interface object with said portion of said second graphical user interface object being enhanced.

4. The method of claim 3 wherein said selecting said second size of said first network device includes selecting said second size from a predetermined list of predetermined sizes.

5. The method of claim 1 wherein said second image includes enhanced portions.

6. The method of claim 1 wherein said first size is 100% and said second size is 66%.

7. The method of claim 1 wherein said first size is 100% and said second size is 33%.

8. A system for resizing a view of a first network device in a network management control application, said system comprising:

a display device;

a memory configured to store a first image of said first network device, said first image corresponding to a first size of said first network device, said first image configured to provide functional communication with said first network device;

an input device configured to receive a selected size of said network device, said selected sized being smaller than said first size of said first network device, and said selected size being configured to increase a number of images that are able to be simultaneously displayed on said display;

a processor, being coupled to said said input device, said processor configured to receive said selected size and configured to generate a resized image of said first network device corresponding to said selected size and display said resized image on said display device, said resized image of said first network device configured to maintain said functional communication with said first network device.

9. The system of claim 8 wherein said resized image of said first network device includes enhanced graphical information.

10. A method of resizing a view of a first network device in a network management application comprising the steps of:

displaying an old size view on a display, said old size view including an old plurality of images corresponding to a physical appearance of a portion of said first network device scaled to said old size, said old plurality of images providing functional communication with said first network device;

receiving a new size;

increasing a number of views that are able to be simultaneously displayed on the display by accessing a new plurality of images corresponding to said new size, each of said new plurality of images corresponding to a physical appearance of a portion of said first network device scaled to said new size, said new plurality of images maintaining functional communication with said first network device;

displaying a new size view, said new size view including said new plurality of images; and displaying a second view on said display, simultaneously with said new size view, said second view including a second plurality of images corresponding to a physical appearance of a second network device, said second plurality of images providing functional communication with said second network device.

11. The method of claim 10 wherein said step of displaying said old size view includes:

generating a network device object;

generating a display object, said display object including an old widget tree, each widget in said old widget tree having one of said plurality of old images; and displaying said old widget tree.

12. The method of claim 11 wherein said displaying said new size view includes:

generating a new display object, said new display object including a new widget tree, each widget in said new widget tree having one of said plurality of new images;

ceasing to display said old widget tree; and displaying said new widget tree.

* * * * *